United States Patent [19]

Czarnowski

[11] Patent Number: 4,736,991

[45] Date of Patent: Apr. 12, 1988

[54] EMERGENCY PRESSURIZED FLUID SYSTEM

[76] Inventor: Jerome A. Czarnowski, 3746 N. Tripp Ave., Chicago, Ill. 60641

[21] Appl. No.: 20,604

[22] Filed: Mar. 2, 1987

[51] Int. Cl.[4] ............................................. B60T 17/06
[52] U.S. Cl. ........................................ 303/85; 303/63
[58] Field of Search ................. 303/1, 2, 9, 14, 63, 303/85

[56] References Cited

U.S. PATENT DOCUMENTS

| | | | |
|---|---|---|---|
| 2,871,066 | 1/1959 | Pannier et al. | 303/63 |
| 2,876,045 | 3/1959 | Kendig | 303/63 |
| 2,920,925 | 1/1960 | Stadtmiller et al. | 303/85 X |
| 2,945,727 | 7/1960 | La Dona | 303/63 |
| 2,977,156 | 3/1961 | Di Gioia | 303/63 X |
| 2,991,129 | 7/1961 | Gasser | 303/85 X |
| 3,294,455 | 12/1966 | Valentine | 303/63 X |

*Primary Examiner*—Duane A. Reger
*Attorney, Agent, or Firm*—Sidney Wallenstein; Ralph R. Rath

[57] ABSTRACT

An emergency auxiliary pressurizing system for a vehicle braking system includes a portable container having clean high-pressure pneumatic fluid therein and connected by conduit means to the vehicle braking system with the conduit having a pneumatic pressure-reducing valve and a relief valve therein with a switch valve for controlling the connection to the braking system.

13 Claims, 1 Drawing Sheet

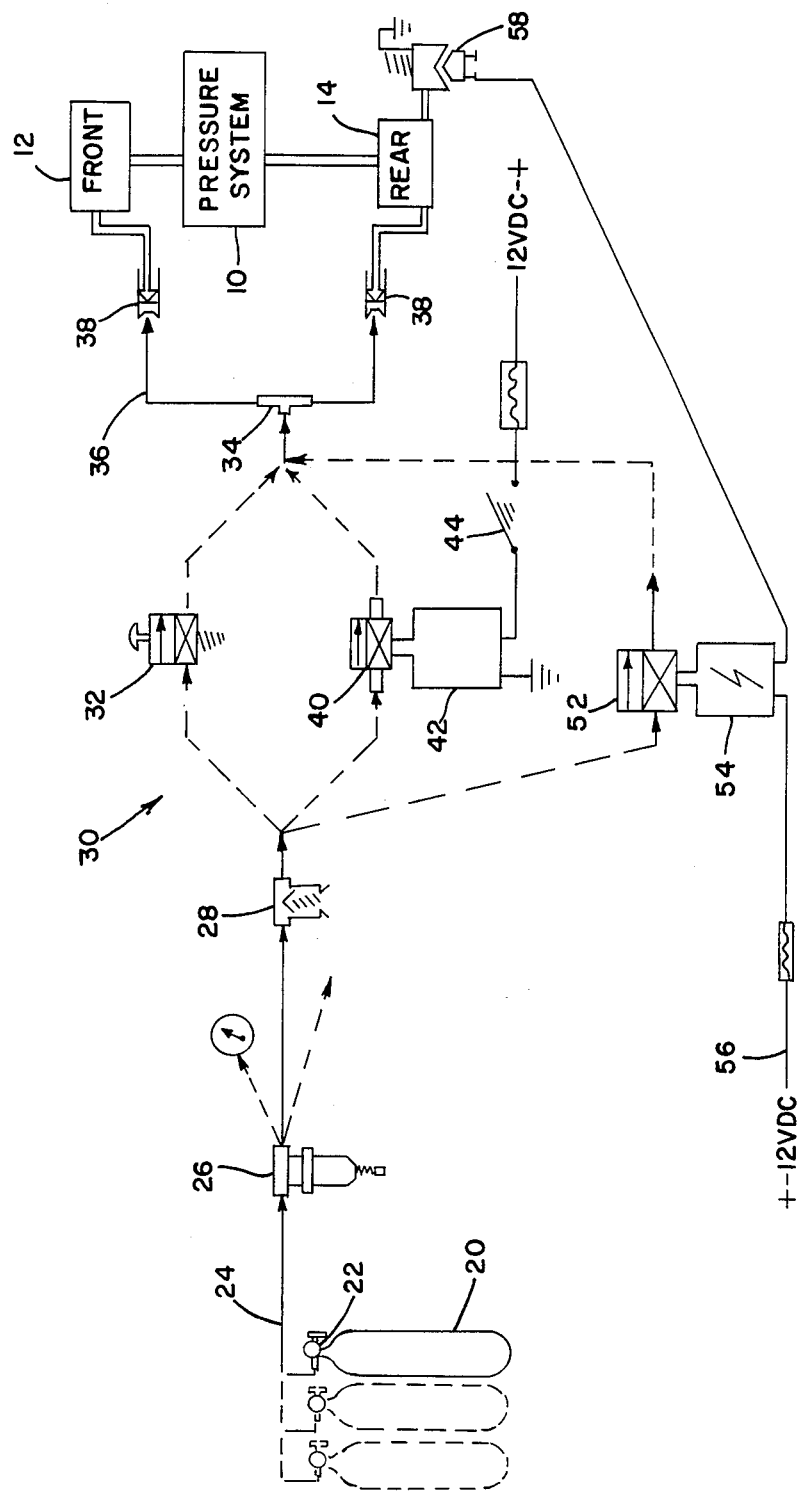

EMERGENCY PRESSURIZED FLUID SYSTEM

DESCRIPTION

1. Technical Field

The present invention relates generally to emergency vehicles, such as fire equipment, and more particularly to an auxiliary pressurizing system for automatically maintaining pressure in the fluid braking system for such vehicles.

2. Background Prior Art

The Federal Government and many state governments have developed industry standards for performance that motor vehicles must meet, such as minimum safety requirements. Thus, manufacturers must insure that all vehicles meet these safety requirements before being put into service. Emergency vehicles, such as fire trucks, must not only meet Federal motor vehicle safety requirements, but also must comply with certain fire department requirements, such as response time. Response time is the time that elapses from the receipt of an alarm from the fire station until the arrival of the vehicle at the site.

This becomes a particularly acute problem when the fire trucks are equipped with industry standard air brake systems which are solely designed to meet the Federal motor vehicle safety requirements. For example, the trucking industry standards allow for an acceptable 2 psi per minute loss of air pressure from the braking system for the vehicle while the vehicle is parked and the compressor is inoperative. However, the trucking industry standard that an air brake system-equipped vehicle must reach operating pressure within five minutes of the time the vehicle is started is incompatable with the emergency service's need to respond rapidly.

Most air pressure brake-operated systems are fully charged at 120 psi. This means that a fully-charged system at 120 psi on a parked vehicle could lose all of its pressurized air within one hour and still meet the minimum trucking industry standards for air brake system-euipped vehicles. Thus, if such an equipped vehicle is parked at a fire station for more than one hour, all of the air pressure is lost in the braking system.

Various solutions have been proposed for minimizing this problem among various fire departments. Many departments have installed "shore lines" or air hoses with disconnects from the stationary air compressor in the fire station to the vehicle's air system. Thus, the system remains fully pressurized at all times, but such solution seems to have drawbacks. Condenstation can develop in the tank and pipes used throughout the building and, thus, rust and contaminants can form in the air brake system. Furthermore, stationary compressors usually have oil associated therewith which can be introduced into the vehicle's air brake system unless filters or separators are added.

Operators have been known to drive the apparatus out of the fire station with the pneumatic and electrical lines still connected, which results in the air hoses being ruptured and the loss of vehicle air brake pressure.

This can result in the mechanical "fail-safe" pressure locks on the wheels, which will stop the vehicle, and could result in damage to the gear train for the vehicle.

More recent vehicles that have been manufactured in the last twelve years have required an initial reservoir or wet tank and separate front and rear reservoirs for the front and rear brakes. In this type of system, normally when the rear system reaches a predetermined safe operating pressure, a valve switches over to fill the front system. This allows the drive line brakes to be released and the vehicle to be operated while the front or steering braking system fills. This also lets the operator control the vehicle in the event of a sudden air pressure-system failure, since the rear brakes will lock in the applied position, while the steering axle brakes are not so equipped, thus allowing control of the vehicle by the operator.

While other systems, such as small compressors, have been proposed for maintaining some pressure in the vehicle air brake system at all times, such systems do not seem to meet the needs of the fire service. Thus, there remains a need for a simple and inexpensive system for continually maintaining emergency fluid pressure available to a vehicle brake system at all times.

SUMMARY OF THE INVENTION

According to the present invention, a unique emergency pressurized fluid source has been developed which utilizes conventional, readily-available containerized pressurized air that is available at most fire departments and forms part of the self-contained breathing apparatus (SCBA) (that is normally available at a fire station). The containerized air bottles provide a source of clean uncontaminated high-pressure air available at all times which can be utilized along with conventional pressure-reducing and pressure flow controlled devices to provide an inexpensive self-contained portable high-pressure emergency fluid source for a fluid-operated braking system that includes a compressor and fluid-operated braking devices.

More specifically, the emergency pressurized fluid system includes a portable container means for storing clean high-pressure air on a vehicle with conduit means leading therefrom. A pressure-regulating means is located in the conduit means for reducing the high-pressure air to braking system operating pressure that is available at all times as a source for maintaining the air pressure in a vehicle braking system. The emergency system has switch means that can manually or automatically connect the portable auxiliary system to the vehicle braking system.

Stated another way, the present invention provides an emergency pressurized-fluid system for maintaining air pressure in an air pressure-operated braking system of a vehicle with the emergency system including a portable container means, such as a containerized air pressure bottle, for storing clean high-pressure air on the vehicle with conduit means connected thereto and pressure-regulating means in the conduit means for reducing the high pressure air to braking system operating pressure with switch means in the conduit means for connecting the container means to the braking system.

The switch means can be in the form of a normally closed, manually-operated air valve, a normally closed solenoid-operated valve or an automatic system for automatically connecting the emergency system to the vehicle braking system when the pressure in the vehicle braking system falls below a predetermine level.

BRIEF DESCRIPTION OF DRAWING

The single FIGURE discloses the emergency pressurized fluid system in conjunction with a conventional vehicle air pressure-operated braking system.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

The single FIGURE discloses a vehicle braking system comprising a pressurizing system, generally designated by reference numeral 10, that is operated by the main power source for the vehicle to supply pressurized fluid to a front braking system, designated by reference numeral 12, and a rear braking system, generally designated by reference numeral 14. As indicated, more recently manufactured vehicles have separate front and rear braking system reservoirs and are pressurized sequentially and remain pressurized at about 120 psi by a single compressor 10. Since these details are all conventional, no detailed description thereof appears to be necessary.

As indicated above, most fluid-operated braking systems are normally operated at a pressure in the range of about 120 psi. These systems normally require a pressure of about 60 psi before the brakes can be operated. In more recent vehicles, the rear braking system is the first to be pressurized to a pressure of at least 60 psi so that it can be operated and thereafter the front braking system is presssurized so that the vehicle can begin its trip to the site while the system is being fully pressurized.

According to the present invention, an emergency pressurized fluid system has been developed that utilizes readily-available portable container means that store clean high-pressure air on the vehicle and are connected through conduit means and conventional pressure-reducing and pressure flow control devices. More specifically, as illustrated in the drawing, the emergency pneumatic pressure system consists of one or more (referred to as a cascade system) portable container means 20, each having individual manually-operated shut-off valves 22 leading to a conduit means 24. The conduit means has a pressure-reducing regulator 26, as well as a pressure relief valve 28, and switch means 30 for connecting the conduit means 24 to the vehicle braking system.

The portable container means or air bottles are preferably bottles that form or contain clean high-pressure air that is normally used for self-contained breathing apparatus that is normally available on a fire truck. For example, these types of bottles are made available to emergency services from Mine Safety Appliance and are rated at a pressure of 2,200 psi. More recently, portable air bottles have been available that have a pressure on the order of about 4,500 psi.

Several types of switch means have been illustrated in the drawing for simplicity purposes and any number of types may be utilized. For example, the disclosed switch means 30 include a normally closed, manually-operated air valve 32 leading to a T-connector 34 which is connected by conduits 36 to unidirectional valves 38 respectively in the front and rear braking systems. Alternatively, a solenoid-operated valve 40 could be utilized and connected directly to the T-connector 34. As illustrated, the solenoid-operated valve 40 could be operated by an electric solenoid 42 connected to a power source through a manual switch 44.

As a further alternative, an automatic sensing means 50 could be utilized to automatically connect the high pressure air source to the braking system when the system pressure drops. Thus, as shown, the automatic sensing means includes a solenoid-operated valve 52 operated by an electric solenoid 54 connected to a power source 56. A sensor 58 senses the pressure of the fluid in the rear braking system, which is the more important braking system, and produces a signal to the solenoid valve 54 whenever the pressure in the braking system drops below a predetermined level, such as 100 psi pressure. When the braking system operating pressure drops below the predetermined level, the solenoid 54 actuates valve 52 to connect conduit 24 to the T-connector 34 and thereby pressurize both the front and rear braking systems to the desired operating level.

As can be appreciated, the system has significant advantages in that standard, commercially-available safety-approved devices can be utilized for connecting a portable high-pressure air source to the braking system at any time. The integrity of the braking system need not be jeopardized since it only requires the addition of two approved-type check valves 38 for not only coupling the emergency pressure system to the vehicle braking system, but also segregating the two systems as a safety factor. Since such connection does not require any changes in the safety features of the braking system that are presently required, approval for use and installation is considerably simplified.

While specific embodiments have been illustrated and described, numerous modifications come to mind without significantly departing from the spirit of the invention and the scope of protection is only limited by the scope of the accompanying claims.

I claim:

1. In a vehicle having a pressurized fluid braking system, including a primary on-board pressurized fluid source operatively connected to fluid-operated braking devices, the improvement of an emergency self-contained portable high-pressure fluid-source being separate and totally isolated from said on-board pressurized fluid source and having conduit means in communication with said braking system, fluid pressure-reducing means in said conduit means for reducing said high-pressure fluid source to normal braking system operating pressure, and switch means in said conduit means for connecting said conduit means to said braking system for supplying pressurized fluid when the system-operating pressure falls below a predetermined level.

2. A vehicle as defined in claim 1, further including relief valve means in said conduit means isolating said emergency fluid source from said braking system when the system-operating pressure is above a predetermined level.

3. A vehicle as defined in claim 1, in which said emergency fluid source is a portable air bottle normally forming part of a self-contained breathing apparatus.

4. A vehicle as defined in claim 1, in which said switch means includes manually-operable, normally closed valve means.

5. A vehicle as defined in claim 1, in which said switch means includes solenoid-operated, normally closed valve means.

6. A vehicle as defined in claim 1, in which said switch means includes sensor means sensing fluid pressure in said brake system and valve means in said conduit means operated by said sensor means.

7. A vehicle as defined in claim 1, in which said braking system includes separate front and rear brakes, each having check valve means therein with said conduit means connected to said check valve means.

8. A vehicle as defined in claim 3, in which there are a plurality of portable air bottles, each having shut-off valve means operable to connect said bottles to said conduit means.

9. An emergency pressurized fluid system for maintaining air pressure in a vehicle having an air pressure-operated braking system comprising portable container means for storing clean high-pressure air on said vehicle with conduit means connected thereto, pressure-regulating means in said conduit means for reducing said high-pressure air to braking system-operating pressure, and switch means in said conduit means for connecting said container means to said braking system.

10. An emergency pressure-fluid system as defined in claim 9, in which said container means is a portable air bottle.

11. An emergency vehicle having a pneumatic pressure-operated braking system, the improvement of an auxiliary pressurizing system for said braking system comprising on-board portable containerized pneumatic pressure means having clean high-pressure pneumatic fluid therein, conduit means connecting said containerized pneumatic pressure means to said braking system with pneumatic pressure-reducing means therein, said conduit means having unidirectional valve means accomodating flow from said pressure means to said braking system whenever the presssure in said braking system falls below a predetermined level.

12. An emergency vehicle as defined in claim 11, in which said pressure-reducing means maintains the pressure of the pneumatic fluid in said conduit means at a predetermined level, and automatic sensing means for sensing the pressure level in said braking system and operatively connecting said containerized pneumatic pressure means to said braking system when the pressure of said braking system falls below a predetermined level.

13. An emergency vehicle as defined in claim 11, further including manually-operated means for connecting said conduit means to said braking system.

* * * * *